(No Model.)
C. W. WAHLENIUS.
COMBINED SNAP HOOK AND FASTENER.
No. 508,259.
Patented Nov. 7, 1893.
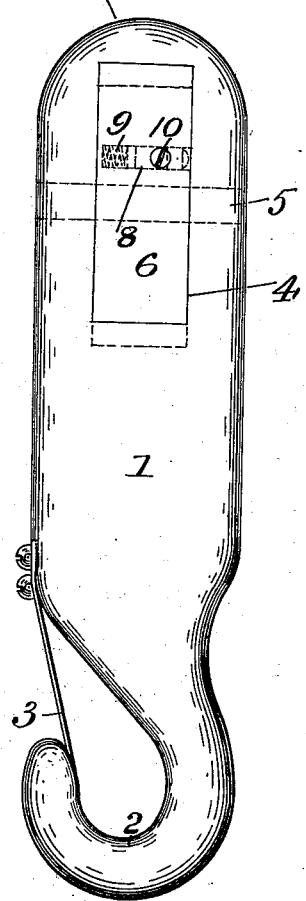
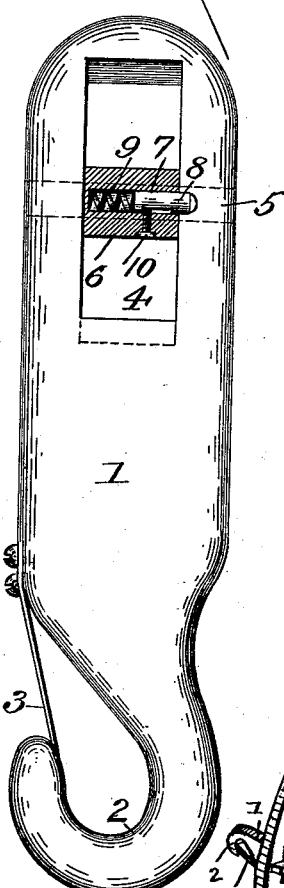
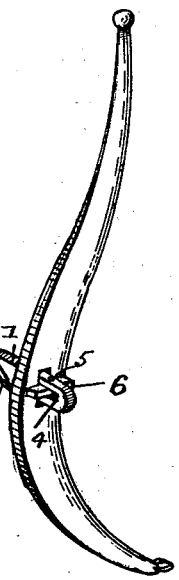
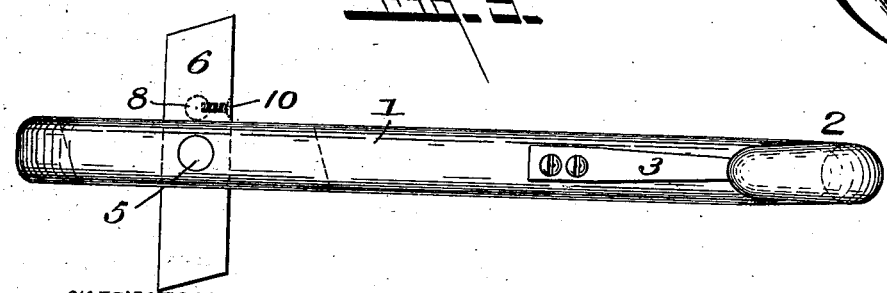
WITNESSES:
F. L. Ourand
W. L. Coombs
INVENTOR:
Carl W. Wahlenius
by Louis Bagger & Co.
Attorneys

UNITED STATES PATENT OFFICE.

CARL WILHELM WAHLENIUS, OF WESTERÅS, SWEDEN.

COMBINED SNAP-HOOK AND FASTENER.

SPECIFICATION forming part of Letters Patent No. 508,259, dated November 7, 1893.

Application filed April 3, 1893. Serial No. 468,905. (No model.)

*To all whom it may concern:*

Be it known that I, CARL WILHELM WAHLENIUS, a subject of the King of Sweden, residing at Westerås, Sweden, have invented certain new and useful Improvements in a Combined Snap-Hook and Fastener; and I do hereby declare that the following is a full, clear, and exact description of the invention, which will enable others skilled in the art to which it appertains to make and use the same, reference being had to the accompanying drawings, which form a part of this specification.

My invention relates to improvements in hame tugs, and its object is to provide a novel construction of the same whereby they may be readily attached to and detached from the hames.

The invention consists in the novel construction and combination of parts herein-after fully described and claimed.

In the accompanying drawings, Figure 1 is a side view of a combined snap hook and fastener constructed in accordance with my invention. Fig. 2 is a similar view showing the parts in a different position. Fig. 3 is an edge view. Fig. 4 is a detail perspective view of a hame showing the manner of attaching the tug thereto.

In the said drawings, the reference numeral 1 designates a metal tug, having one end formed into a hook 2, and provided with a spring arm 3, so that it may be connected with a ring or loop, after the manner of an ordinary snap hook. At the opposite end the tug is formed with an oblong hole or opening 4, provided with a pin 5, passing centrally therethrough and through the tug 1. On this pin is pivoted an arm 6, similar in shape and size to the opening 4, which is provided with a recess 7 in which is seated a pin 8, and a coiled spring 9. This arm is also provided with a set screw 10 for holding the pin 8 in place. The ends of the arm 6 may be beveled as seen in Fig. 3, in which case the ends of the opening 4 are similarly beveled.

The operation is as follows: The hames are formed with a slot of the shape and size of the tug 1 in cross section. In using the device the pivoted arm is turned on its pivot so that it will be seated in the opening 4, therein, so as to present no obstruction to the free passage of the tug, which is passed through the slot in the hames. After passing through said slot the arm is turned at a right angle as in Fig. 3, and the pin 8 will be pushed outwardly by the coiled spring, preventing return movement of the said arm. The tug will thus be prevented from being disengaged from the hames until pin 8 is pushed in and the arm again seated in its opening. The set screw is for the purpose of holding the pin 8 in place so as to prevent accidental pushing in of the same.

While I have described the device as a tug for hames, I do not wish to limit myself to such, as it may be employed for connecting the traces to a whiffletree, and for other different purposes.

Having thus described my invention, what I claim is—

1. The herein described hame tug having an oblong slot at one end, the pivot pin, the arm pivoted thereon, and the spring actuated pin seated in a recess in said arm, substantially as specified.

2. The combination with a hame tug provided with a snap hook at one end and formed with an oblong slot at the other end, of the arm pivoted to said tug and adapted to seat in said hole and the spring actuated pin and the set screw, substantially as described.

In testimony that I claim the foregoing as my own invention I have hereunto affixed my signature in presence of two witnesses.

CARL WILHELM WAHLENIUS.

Witnesses:
ROBERT ADERMARY,
ERNST OLSSON.